United States Patent [19]

Peterson

[11] Patent Number: 5,325,177
[45] Date of Patent: Jun. 28, 1994

[54] OPTICAL, INTERFEROMETRIC HOLE GAUGE

[75] Inventor: Lauren M. Peterson, Ann Arbor, Mich.

[73] Assignee: Environmental Research Institute of Michigan, Ann Arbor, Mich.

[21] Appl. No.: 968,400

[22] Filed: Oct. 29, 1992

[51] Int. Cl.$^5$ .............................................. G01B 9/02
[52] U.S. Cl. ................... 356/357; 356/345; 356/384
[58] Field of Search ............... 356/345, 357, 358, 384, 356/241

[56] References Cited

U.S. PATENT DOCUMENTS 3,577,643  5/1971  Schmidt ........................... 33/178

FOREIGN PATENT DOCUMENTS 0153502  7/1986  Japan .............................. 356/357
8809509  12/1988  PCT Int'l Appl. ................. 356/358
0227597  2/1969  U.S.S.R. ........................... 356/357

Primary Examiner—Samuel A. Turner
Attorney, Agent, or Firm—Krass & Young

[57] ABSTRACT

An optical gauge for measuring the dimension of a hole in a workpiece employs an interferometric technique using a partially coherent radiation source. A beam of the radiation is directed to a beam splitter positioned a known distance from one of the known surfaces to produce a first sub-beam extending to a mirror and a second sub-beam along the axis of measurement. The mirror is adjustably positioned along the first sub-beam axis by a micrometer head. A radiation detector positioned on the opposite side of the beam splitter from the mirror receives light reflected by the second workpiece surface and light reflected by the mirror. Interference between the numerous wavelengths in the two beams results in a mixture of constructive and destructive interference at all positions of the mirror except that position where the path lengths are exactly equal. When the mirror is adjusted to this position, all wavelengths which make up the beams interfere constructively and a high amplitude signal is generated by the detector. The light at the detector has a speckle pattern and each detector element is approximately the size of a speckle. Three such sensors may be combined in a single gauge suspended in a bore for measuring the distances at 120 degree angles from the gauge to the bore wall and the true diameter is computed from the three distances.

19 Claims, 3 Drawing Sheets

NON-CONTACT OPTICAL BORE HOLE GAUGE

OPTICAL, INTERFEROMETRIC HOLE GAUGE

FIELD OF THE INVENTION

This invention relates to interferometric optical methods and apparatus for measuring distance and more particularly to an optical method and apparatus employing the interference between two beams of partially coherent light to measure internal dimensions of workpieces.

BACKGROUND OF THE INVENTION

In recent years industries such as aircraft, automotive and electronics have created a demand for very high precision metal parts. It is becoming increasingly common to specify dimensions in thousandths-of-an-inch rather than hundredths-of-an-inch as was the general practice a decade ago. Drilling and boring of precision holes in metal parts in particular requires accurate measurements to ensure that the inside hole diameter tolerance is satisfied for all depths, that the out-of-round tolerance is not exceeded and that the surface roughness is within specification.

The best commercially available bore diameter measuring instruments are hand operated, mechanical contact devices with digital readout, and the accuracy of the measurements they produce usually depends upon the skill of the operator. Using these instruments out-of-round measurements are achieved through multiple readings along different diameters and the accuracy of the measurements tends to be subjective.

Very high precision measurements of bore holes and the like can be made using coherent optical interferometric techniques employing lasers as the coherent light source, but these instruments are delicate, expensive, slow and not generally amenable to hand-held use. A current paper, Dresel et al, "Three-dimensional sensing of rough surfaces by coherence radar", Applied Optics, 31, 919–925 (1992), not known to be prior art discloses optical interferometric techniques not limited to coherent light and teaches acquiring three dimensional data of rough objects as well as the use of wide band radiation.

SUMMARY OF THE INVENTION

The present invention is accordingly directed toward an optical micrometer for measuring inside dimensions in general and more particularly diameters of bore holes, which employs partially coherent radiation techniques and is low-cost, reliable in operation, and amenable for use as a hand-held instrument, yet provides measurements that are independent of the subjective interpretation of the operator.

Generally, the present invention is directed toward a method of and apparatus for measuring the distance along a first axis, between a pair of workpiece surfaces, using interferometry employing a partially coherent, wide band-width radiation source selected from ultraviolet, visible or infrared spectra, hereinafter referred to as "light" or "radiation". The gauge constituting one embodiment of the invention employs a beam splitter supported a known distance or a determinable distance from one of the workpiece surfaces. An incoming radiation beam is divided by a 45° beam splitter into a first sub-beam which extends to a reflective surface or mirror and a second sub-beam which is projected along the axis of measurement. The mirror is supported for movement along the first sub-beam axis so that its distance from the beam splitter may be adjusted.

A radiation detector is supported on the opposite side of the beam splitter from the mirror to receive light from the second sub-beam as reflected by the second workpiece surface back to the beam splitter and then bent through 90° by the beam-splitter, and light from the first sub-beam as reflected by the mirror through the beam-splitter. The output of the detector represents the interferometric sum of the amplitudes of the numerous wavelengths in the two beams and constitutes a mixture of constructive and destructive interference at all positions of the mirror except that in which the path lengths of both sub-beams are exactly equal; i.e., the position of the mirror at which it is spaced by the same distance from the beam splitter as the beam splitter is spaced from the second workpiece surface.

At this position of zero path difference between the two sub-beams, all wavelengths of tile two sub-beams interfere and as-the mirror is moved through this position a burst of signal is generated by the detector. This resulting spike may be as narrow as a single wavelength of light with a very broad band illumination. Since the beam splitter is supported at a known distance from the first workpiece surface, this interferometric measurement of the distance of the beam splitter from the second workpiece surface provides a highly precise measurement of the distance between the surfaces.

According to one modification of this optical arrangement, a lens collects light reflected by the second workpiece surface and focuses it onto a very small detector having about the size of speckle in the radiation pattern, or an array of such detectors, thereby realizing both the desired interference effect and a good signal to noise ratio.

In one embodiment of the invention, which will subsequently be described in detail, the position of the mirror relative to the beam splitter is adjusted by a micrometer head which provides a precise measurement of the mirror from the beam splitter and thus the workpiece dimensions being measured. The mirror may be positioned by an actuator which receives feedback from the detector and provides an electronic display of the measure of internal dimension.

In an alternative embodiment of the invention, three of the zero path difference micrometers are incorporated in a single device adapted to be supported in the bore hole without contacting the wall of the hole. By measuring the absolute distance to three points on the bore hole wall, the diameter of the hole is uniquely determined. By rotating the unit while recording all measurements, the out-of-round characteristics of the bore hole at any depth may be readily determined.

Other objectives, advantages and applications of the present invention will be made apparent by the following detailed description of several embodiments of the invention. The description makes references to the accompanying drawings in which:

DETAILED DESCRIPTION OF THE INVENTION

Figure 1:
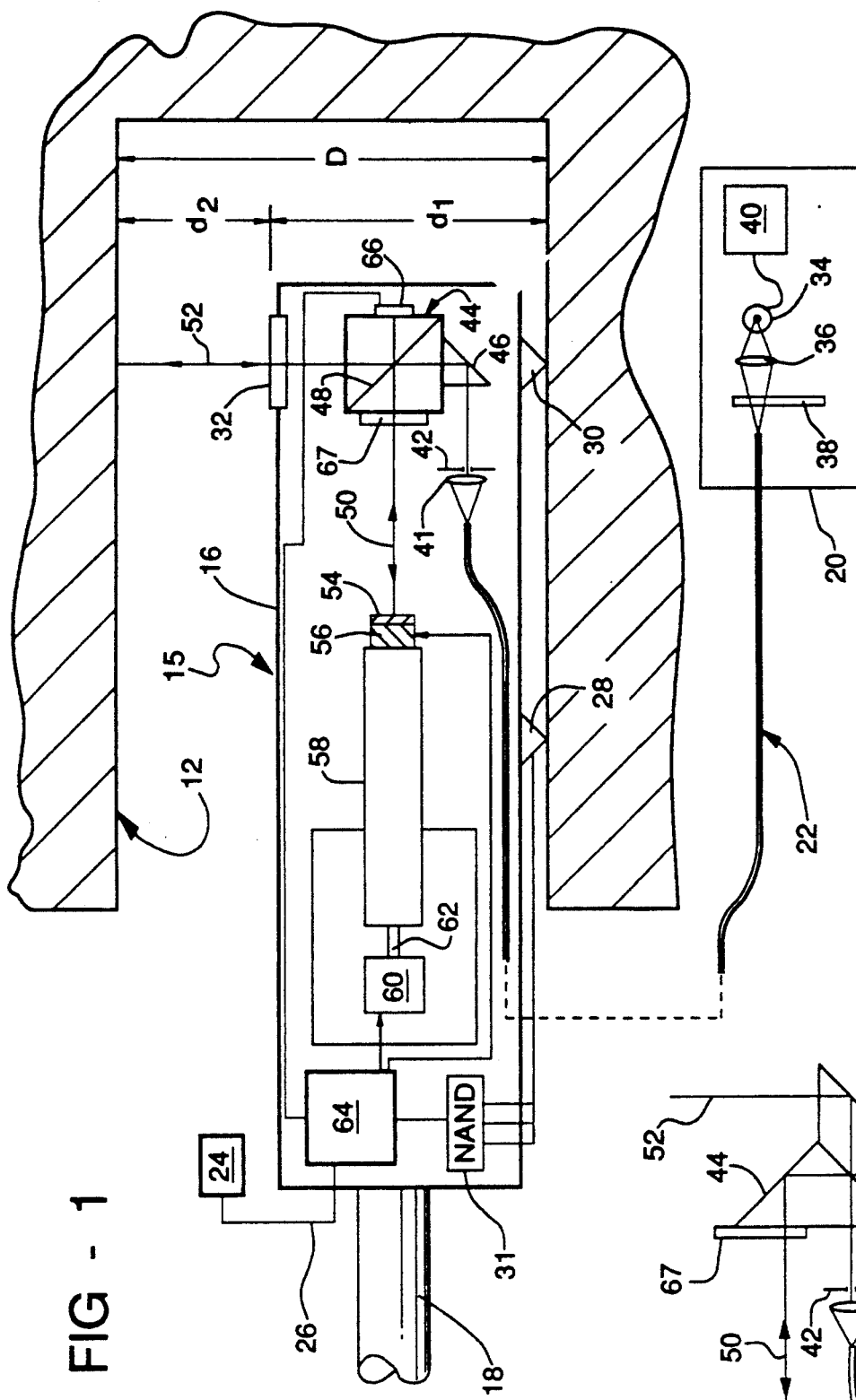
FIG. 1 is a sectional view of a bore hole gauge, as disposed within a bore hole, in partial schematic form.
Figure 2:
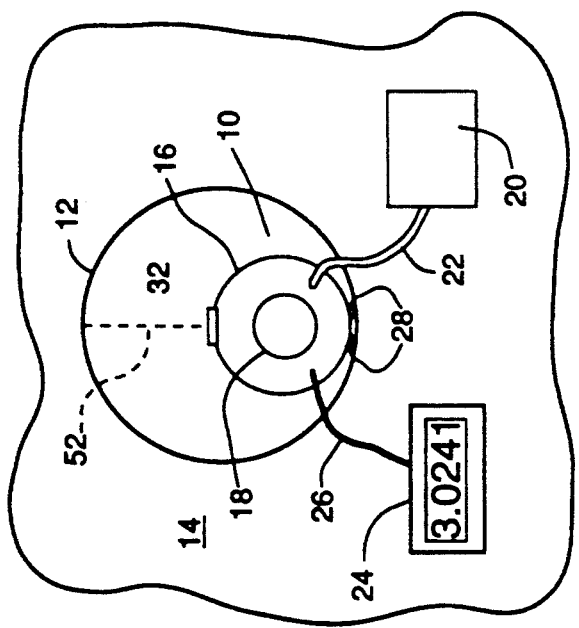
FIG. 2 is an end view of the instrument of FIG. 1 disposed within a bore hole.

Referring to FIGS. 1 and 2, an optical interferometric sensor head generally indicated at 10 is illustrated in position within a bore hole 12 formed within a workpiece 14, in order to measure a diameter D of the hole at a particular depth and a particular angular orientation within the hole 12. Measurement of the diameter D is akin to measurement of the distance between two diametrically opposed points in the bore hole 12 and the sensor head 10 may also be used to measure the distance between any two points on opposing surfaces of a workpiece.

The sensor head 10 generally comprises a cylindrical bore hole gauge, generally indicated at 15, adapted to be manually supported in the hole 12 at an appropriate depth and angular position by a handle 18. An optical source 20 is connected to the gauge 15 by a fiber optic cable 22, and an indicator display 24, is connected to the gauge 16 by electric wires 26. The gauge is encased within a generally cylindrical housing 16 having a smaller diameter than the hole to measured. The housing 16 is supported against one internal surface of the hole 12 by two longitudinally based pairs of anvils 28 and 30. Each pair consists of two spaced conical projections with hardened, pointed ends. The projections are circumferentially spaced from one another by a small angle, such as 15 degrees. All four projections are brought to bear against the internal diameter of the hole 12 by forces exerted on the handle .18: they accurately align the gauge housing 16 longitudinally along the hole. The housing 16 has an optically transparent window 32 centered about a point diametrically opposed from a longitudinal line extending midway between each pair of anvils 28 and 30. The window is not essential, except to keep dirt out of the instrument, but can be useful as a fiducial reference when calibrated, as discussed below. When the housing 16 is properly positioned with the anvils 28 and 30 bearing against the inner surface of the bore hole 12, a line from the center of the housing 16 through the center of the window 32 is aligned with a diameter of the hole 12.

Figure 3:
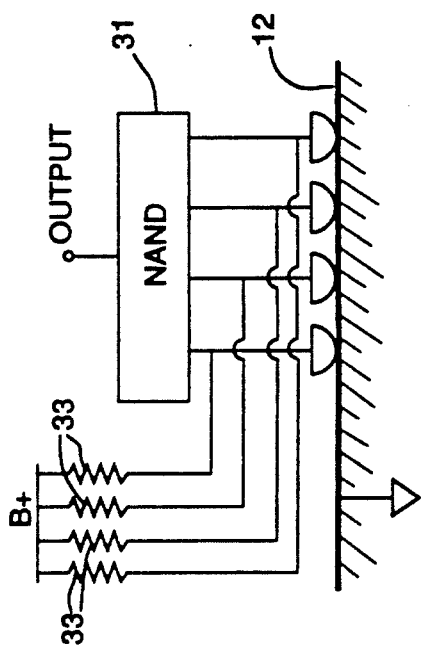
FIG. 3 is schematic diagram of a continuity test circuit of the gauge of FIG. 1.

It is important that the anvils 28, 30 make contact with the bore wall during measurement and to insure such contact a test circuit is provided. Each anvil is conductive and the housing 16 is insulating or, if the housing is conductive, the anvils are insulated from the housing, and the workpiece is metal and is grounded. Then the continuity between the anvils and the workpiece can be monitored to give an indication of any failure to maintain contact with the bore wall. As shown in FIG. 3, each anvil 28, 30 is connected to an input of a NAND gate 31 and the same inputs are connected through resistors 33 to a voltage source. The gate output is connected through a computer 64, to be described, to affect the display 24. As long as the anvils all make contact the NAND gate 31 inputs are all grounded and the gate output is on. If any anvil fails to make the ground connection, the output will go off to provide a signal that the gauge is not properly positioned against the bore hole wall.

The optical source 20 contains a broad band radiation source such as an ultraviolet, visible or infrared source and may include, for example, an LED or an incandescent lamp 34. Light from the lamp 34 is focused by a lens 36 onto the input end of the optical fiber 22. A bandpass filter 38 is interposed between the lens 36 and the optical fiber 22. Preferably the light is partially coherent; that is, it should have a coherence length of a micrometer to a millimeter. Lamp 34 is energized by a power supply 40. In alternate embodiments of the invention, all of the components of the optical source 20 ght be supported within housing 16 or the radiation source 34 and its associated components might be located within the housing and the power supply externally located.

The output end of the optical fiber 22 is disposed within the housing 16 and its light output is focused by a lens 41 through a clipping aperture 42, onto a beam splitting prism generally indicated at 44. The prism includes a 45° mirror 46 which directs the beam to a dielectrically coated plate, pellicle or beam splitter cube 48 arrayed at 45° to the longitudinal axis of the housing 16. This divides the beam from the mirror 46 into two sub-beams. A first sub-beam 50 extends longitudinally to the housing 16 along what will be termed the central axis of the instrument. This axis is parallel to a line between the ends of the two anvils 28 and 30. The second sub-beam 52 extends normally to the first sub-beam 50 and passes through the window 32 in the housing 16 to illuminate a point on the internal surface of the bore hole 12 diametrically opposed to a longitudinal line on the bore hole surface midway between the two points of each anvil set 28 and 30. The sub-beam 50 is directed toward a mirror 54 having a reflective surface disposed normally to the sub-beam 50. The mirror 54 is supported on a piezo-electric head 56 positioned on the output of a micrometer head 58. The micrometer head is controlled by a drive motor 60 which controls the rotation of a screw 62. Drive signals for the motor 60, which is preferably a digital stepping motor and the piezo-electric head 56, are provided by a computer 64. The computer receives input from a radiation detector or detector array 66 supported on the beam splitter prism 44 on the opposite side of the beam splitter 48 from the sub-beam 50 and along the sub-beam 50 axis. Detector 66 receives two light components: one from that portion of the sub-beam 50 which is reflected by the mirror 54 back to the beam splitter 48, and passed therethrough to the detector; the other from that portion of the sub-beam 52 which is reflected by the wall of the bore hole 12 back to the beams splitter 48 and thence to the detector 66. The detector 66 thus provides an output signal proportional to the sum of the amplitudes resulting from interference between the elements of each of these two beam components at the variety of wavelengths that comprise the output of the filter 38.

To enhance the interference phenomenon, it is beneficial that the two beams be of somewhat equal intensity, within perhaps 50%, although more poorly balanced beams will give acceptable results. To this end, an optional attenuator or neutral density filter 67 is included in the path of the first sub-beam 50 and is conveniently attached to the wall of the beam splitter 48. Since the reflected beam from the mirror 54 is more directional and therefore stronger than that of the second sub-beam 52 reflected from the bore hole wall, the attenuator reduces the intensity of the first sub-beam 50 to more nearly match the second sub-beam 52. If a beam splitter plate is used at 48, the attenuator 67 may serve as a compensation plate as well. Alternatively, the mirror 54 may be of low reflectivity.

Figure 1A:
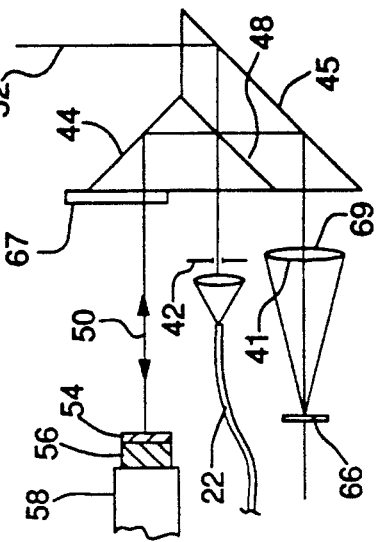
FIG. 1a is a view of a portion of FIG. 1 showing a modified construction.

Another embodiment which which may assist in the equalization of the beams by more efficiently managing the sub-beam 52 and also accounts for the effects of speckle is shown in FIG. 1a. There, the light from the aperture 42 first impinges on the beam splitter 48 for division into the two sub-beams 50 and 52, and the mirror 45 is located in the path of the second sub-beam 52 so that the reflected sub-beam 52 is twice reflected from the mirror 45 and also from the beam splitter 48 to reach the detector or array 66. Intermediate optics such as a lens 69 in the space between the detector 66 and the beam splitter 48 collects the light from the reflected sub-beam 52 and focuses it on the detector 66, thereby utilizing light which may otherwise stray from the beam path.

It is important to realize that the radiation at the detector is not uniform in intensity but is very granular and is composed of tiny cells called speckles. In order for the instrument to work effectively, the size of an individual detector must be approximately equal to a speckle size. If the detector encompasses several speckles, the desired interference at zero path difference will be almost totally lost and if it is smaller than a speckle, the signal decreases in proportion to the area.

The spot size of the illumination radiation at the bore hole should be small, approximately 0.5 mm or less such that the curvature of the bore wall does not give an erroneous diameter measurement. A single element detector may be used that matches the speckle size which may be approximately 1 mm, but several detector elements (each matching the size of a speckle) in an array would provide a greater signal. In the embodiment of FIG. 1a, a lens 69 is used to gather reflected radiation from the bore hole wall and focus it onto a detector array 66. The larger diameter of the lens 69 leads to a smaller speckle size and therefore a small detector element. Typical detector elements in commercially available arrays are about 0.001 inch in size. A small detector element is advantageous due to its lower noise and because a greater number may be packed into a small area. This leads to a superior signal noise ratio.

Figure 5:
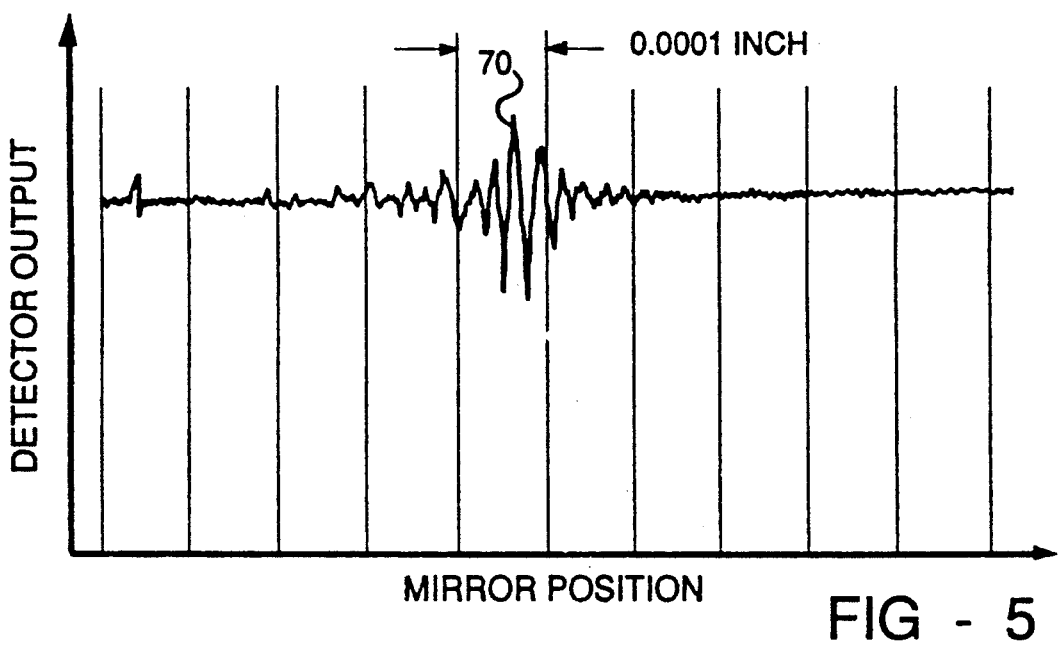
FIG. 5 is a plot of the output of the bore hole gauge of FIGS. 1 and 2 as the mirror is moved through the position of zero path difference.

FIG. 5 represents a plot of the amplitude of the detector output for various positions of the mirror 54. At any position of the mirror, certain of the components of the two beams that reach the detector 66 will constructively interfere and others will destructively interfere. However, at the position of the mirror 54 at which its distance from the beam splitter 48 exactly equals the distance of the point on the bore hole wall illuminated by the sub-beam 52 from the beam splitter 48 all of the components will constructively interfere, producing a burst of radiation comprising a series of spikes 70 of output amplitude. The FIG. 5 plot was made using an interferometer with mirror reflector for the hole surface and an incandescent light source with a filter passing light of wavelengths greater than about 600 nm. The larger spikes of the burst all occur within about 0.0001 inch so that the mirror position can be determined with high precision. The use of wider band radiation results in an even narrower radiation burst; thus even greater precision could be attained, if desired, but the radiation burst becomes more difficult to detect as the mirror scans throughout its range. This position of the mirror 54 is referred to as the zero path difference position of the interferometer. Computer 64 acts to detect the largest spike and to control the position of the mirror 54 through the motor 60 to achieve this position. The computer 64 also sends an alternating current dithering signal to the piezo-electric position head 56 to cause it to alternatively expand and contract about a ten thousandth of an inch to allow the computer to detect the spike 70. That amount of dithering movement is sufficient to scan the mirror through most of the radiation burst; the signal voltage at the peak value providing an adjustment to the mirror position as determined by the motor 60 position.

If there is .not a single central spike in the interference shown in FIG. 5 due to the roughness of the interior of the bore hole compared to a wavelength of radiation, the maximum of the interference waveform may be obtained by signal processing which may include: 1) high pass filtering, 2) rectification, 2) low pass filtering (to obtain the envelope of the waveform), 4) differentiation, and 5) detection of the zero-crossing for the differentiated envelop. This zero-crossing represents the position of the waveform maximum and therefore a best choice for the precise location of a plane representing the rough bore wall.

The computer 64 sends a signal on line 26 to the display 24 which provides a digital readout of the position of the mirror 54 and thus of the diameter D of the bore hole at that point. By manually positioning the housing 16 at different rotational positions within the bore hole the roundness may be determined. Also, by manually positioning the housing 16 at different longitudinal positions within the bore hole, any taper or barrel effect may be determined. Accordingly, such an instrument is able to fully characterize a hole.

The instrument is calibrated by operation within a precision ring of known diameter. The computer measurement of the ring is related to that known diameter and in subsequent measurements the deviation of the mirror position from that calibrated value is used to determine the diameter of the bore being measured. The effect of the bore curvature and the anvil spacing on the measurement is also calculated by the computer and used to determine the value to be displayed. Once the instrument is calibrated, the position of the window 32 can be determined and used as a subsequent verification of the calibration. Each surface of the window 32 will reflect a portion of the second sub-beam 52 and combine with the first sub-beam 50 at the detector 66 to yield radiation bursts which are useful to determine the window position. Thus the position of, say, the outer window surface can be used as a built-in reference value.

Figure 4:
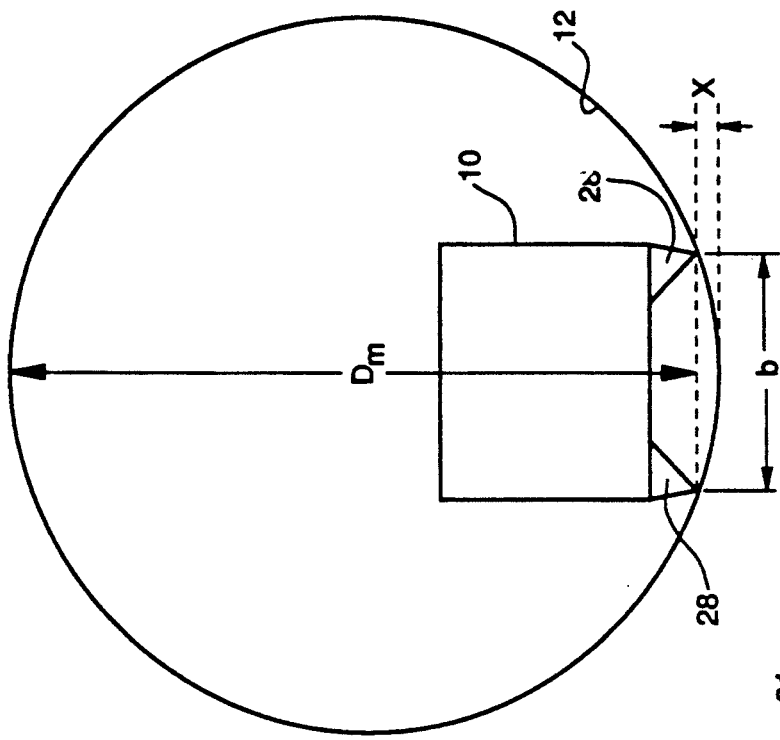
FIG. 4 is a diagram illustrating the geometry of the gauge of FIG. 1 and its support anvils.

Since the anvils 28 and 30 position the window 32 a known or determinable distance $d_1$ from that longitudinal line the distance $d_2$ along subaxis 52 through the bore hole wall when added to $d_1$ provides the measured diameter $D_m$ of the bore hole along sub-beam 52. The distance $d_1$ is not a constant value but rather varies slightly as a function of the surface curvature between the anvil contact points. The "error" x due to curvature can however be calculated from the measured value of $D_m$ and thus is known for each measurement. As shown in FIG. 4, if the measured distance $D_m$ is the distance between the plane of the anvils and the illuminated spot on the opposite wall, x is the distance due to curvature, and b is the known anvil base, then the true diameter is $D = D_m + x$, where $x = b^2/D_m$.

Figure 6:
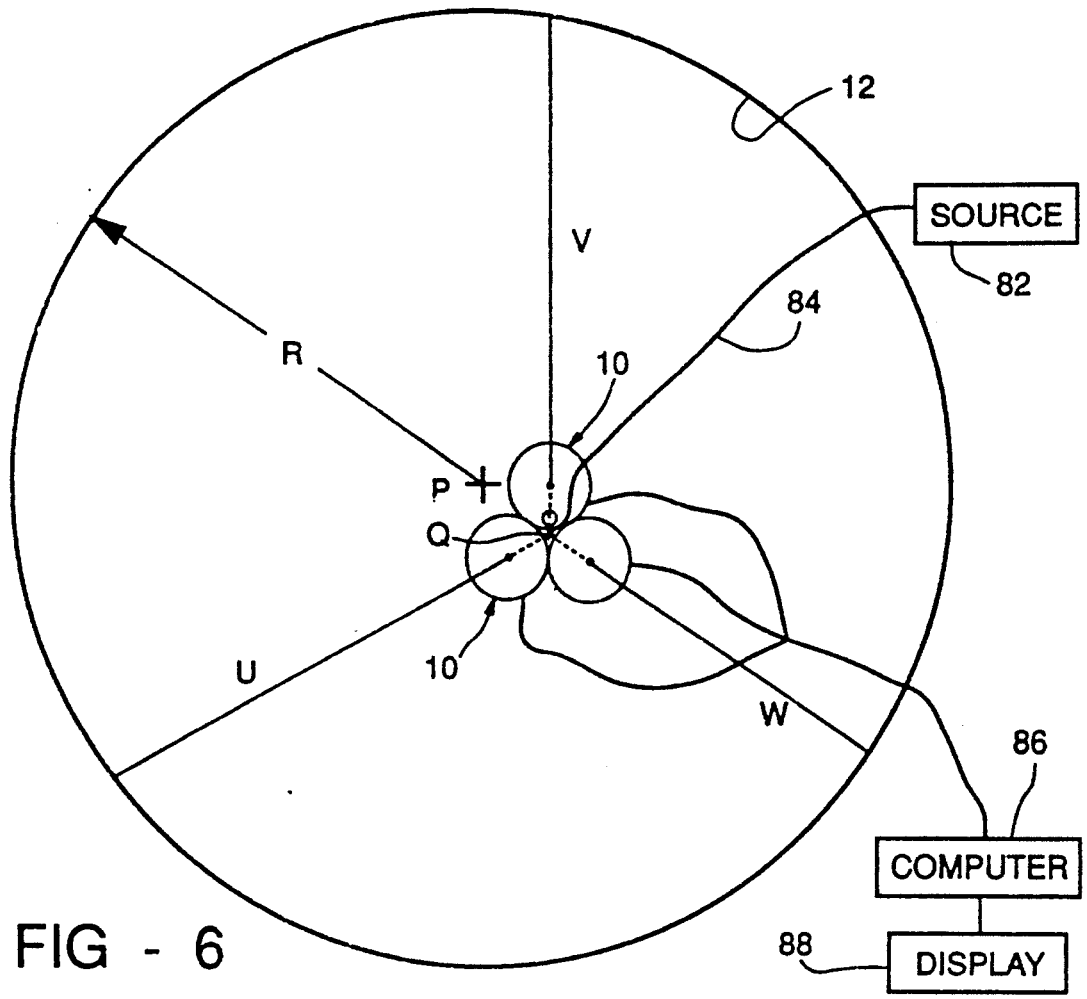
FIG. 6 is a schematic illustration of a second embodiment of the invention, employing three beams projecting at 120° with respect to one another to gauge a bore hole without contacting the walls.

Rather than measure a bore diameter by contacting one side of the bore with the interferometric sensor head and measuring the distance across the bore, a suite of three sensor heads can be suspended in a bore spaced from the bore surface and three measurements can be made and combined to calculate the radius. FIG. 6 shows a schematic cross section of a bore hole 78 having a central axis P and containing a sensor suite 80 comprising three sensor heads 10 (less anvils) packaged together with a radiation source 82 supplying all three heads via a fiber optic cable 84, a single computer 86 servicing all three sensor heads 10 and a display 88. The sensor suite 80 has a central axis Q and three sub-beams are emitted from the heads 10 at an angular spacing of 120 degrees of one another such that the sensors 10 measure distances u, v, and w from the axis Q to respective points on the bore wall. The bore hole radius R is calculated from the equation $$R = ABC/4 [S(S-A)(S-B)(S-C)]^{\frac{1}{2}}; \text{ where}$$
$$A = (u^2 + v^2 + uv)^{\frac{1}{2}},$$
$$B = (u^2 + w^2 + uw)^{\frac{1}{2}},$$
$$C = (v^2 + w^2 + vw)^{\frac{1}{2}}, \text{ and}$$
$$S = (A + B + C)/2.$$

To obtain accurate measurements the sensor suite axis Q must be parallel to the bore axis. Where the instrument is hand held, a tilt will result in a reading larger than the true bore size. Then it is desirable to manually adjust the attitude of the sensor suite 80 while taking readings to obtain the minimum value.

It will thus be seen that the diameter of a bore hole or other internal measurement may be made very accurately by a hand-held gauge employing interferometry and a partially coherent light source chosen from a wide variety of sources. The gauge may be constructed to be held against one surface to measure the distance to the other or it may be suspended within a bore without contact to measure the diameter.

The embodiments of the invention in which an exclusive property or privilege is claimed are defined as follows.

I claim:

1. A gauge for measuring an internal dimension of a work piece hole, the gage having a housing and an optical axis and further comprising:

means for supporting the gauge housing on a surface of a hole to be measured with the optical axis parallel to the axis of the hole;

a partially coherent light source for providing a light beam in the housing;

a beam splitter in the housing supported on the optical axis to receive said beam of light so as to divide said beam into first and second sub-beam projecting along mutually perpendicular paths, the second sub-beam being directed to the hole surface to illuminate a local portion of the surface at one side of the hole;

a reflective surface disposed normally to the path of the first sub-beam to receive the first sub-beam from the beam splitter and reflect the first sub-beam back to the beam splitter;

means for moving said reflective surface along the path of the first sub-beam so as to adjust its distance from said beam splitter;

an optical detector positioned on the opposite side of the beam splitter from the reflective surface for receiving reflections from the reflective surface and from the hole surface; and means connected to the detector for analyzing its output;

whereby the output of the detector represents the interferometric summation of said reflections and varies as said reflective surface is moved along said optical axis and peaks in amplitude when the distance of the reflective surface from the beam splitter and the distance of the illuminated surface of the hole from the beam splitter are equal.

2. The gauge of claim 1 wherein the hole is a bore hole and wherein the means for supporting the gauge housing includes means for positioning said optical axis  et distance from a portion of the bore hole diametrically opposed to the illuminated bore hole surface so as to allow determination of the bore hole diameter.

3. The gauge of claim 1 wherein the hole is substantially cylindrical and the means for supporting the gauge housing includes means for positioning said optical axis a known distance from a longitudinal line on the hole surface and diametrically opposed from the hole surface illuminated by said second sub-beam, so as to allow the measurement of the diameter of said hole by said gauge.

4. The gauge of claim 1 in which said means for moving said reflective surface along said optical axis comprises a manual adjustment mechanism.

5. The gauge of claim 4 including indicator means for displaying a measurement of the position of said reflective means relative to said beam splitter.

6. The gauge of claim 1 including means for adjusting the position of said reflective surface along said optical axis under control of the means for analyzing the output of the optical detector so as to maximize the interferometric summation output of said detector and thereby position said reflective surface at the same optical distance from the beam splitter as the workpiece surface illuminated by said second sub-beam.

7. The gauge of claim 1 wherein the light source is broadband, and including filter means in the light beam for limiting the band width of the light.

8. The gauge of claim 1 including a window in said housing adapted to pass said second sub-beam from said beam splitter to the illuminated hole surface and to pass reflections from said hole surface to said beam splitter, and means for positioning said housing in abutment to a second side of the hole surface opposite the illuminated hole surface portion so that said optical axis is a determinable distance from said second side of the hole surface, whereby the gauge may be used to measure the distance from said illuminated surface to said second side of the hole surface.

9. The gauge of claim 1 including calibration means comprising a window in said housing for passing the second sub-beam from the beam splitter to the hole surface and also for reflecting a portion of the second sub-beam from a surface of the window to the beam splitter, wherein the position of a surface of the window is accurately known and reflections from the window surface give rise to measured radiation bursts at the detector, whereby the window surface position is useful as a fiducial reference for gauge calibration.

10. The gauge of claim 8, including an optical source for said light beam disposed exteriorly of said housing and an optical fiber extending between the housing and said light source operative to illuminate said beam splitter with said light beam.

11. The gauge of claim 1 wherein the means for supporting includes a plurality of anvils for engaging the surface of the hole and wherein the gauge further includes means for assuring the contact between the anvils and the surface comprising a continuity test circuit connected to the anvils.

12. The gauge of claim 1 including means in the path of the first sub-beam for attenuating the first sub-beam to approximate the second sub-beam for improving the interferometric summation of said reflections.

13. The gauge of claim 1 including intermediate optical means between the beam splitter and the detector for collecting reflections from the hole surface and passing such reflections to the detector.

14. The gauge of claim 1 wherein the reflections produce a speckle pattern at the detector and wherein the detector comprises a detector element having the same approximate size as an individual speckle.

15. The gauge of claim 1 wherein the reflections produce a speckle pattern at the detector and wherein the detector comprises an array of detector elements, each element having approximately the same size as an individual speckle.

16. A gauge for measuring the radius of a bore hole comprising:
   a package of three optical sensors for suspension within a bore hole for measuring the distance in three directions from the center of the package to the surface of the hole;
   a partially coherent radiation source for supplying the three sensors;
   each sensor having an optical axis, a beam splitter in the housing supported on the optical axis to receive said beam of light so as to divide said beam into first and second sub-beams projecting along mutually perpendicular paths, the second sub-beam being directed to the hole surface to illuminate a local portion of the surface at one side of the hole, a mirror disposed normally to the path of the first sub-beam to receive the first sub-beam from the beam splitter and reflect the first sub-beam back to the beam splitter, means for moving said mirror along the path of the first sub-beam so as to adjust its distance from said beam splitter, and an optical detector positioned on the opposite side of the beam splitter from the reflective surface for receiving reflections from the reflective surface and from the hole surface and where constructive interference occurs; and
   control means coupled to the detector outputs for sensing constructive interference and coupled to the mirrors for moving each of the mirrors to a position where the constructive interference occurs, the control means including means for calculating the bore hole radius from the distances measured for each sensor.

17. The invention as defined in claim 16 wherein the three sensors measure distances u, v and w in directions separated by 120 degrees; and
   the control means calculates the bore hole radius R from the equation $$R = ABC/4 \, [S(S-A)(S-B)(S-C)]^{\frac{1}{2}}; \text{ where}$$
$$A = (u^2 + v^2 + uv)^{\frac{1}{2}},$$
$$B = (u^2 + w^2 + uw)^{\frac{1}{2}},$$
$$C = (v^2 + w^2 + vw)^{\frac{1}{2}}, \text{ and}$$
$$S = (A + B + C)/2.$$

18. The method of measuring the distance along a line between first and second separated surfaces comprising:
   illuminating a beam splitter with a partially coherent beam of light so as to create a first sub-beam extending along a first path and a second sub-beam extending along a second path at least partially coincident with said line for illumination of the first of said surfaces;
   positioning the beam splitter a determinable distance from the second of said surfaces;
   positioning a mirror for movement along the first path;
   positioning an optical detector on the opposite side of the beam splitter from said mirror for receiving light reflected from the mirror and from the first of the surfaces;
   analyzing the output of said detector;
   moving the mirror along said first path until the output of the detector peaks, and measuring the optical distance of the mirror from the beam splitter at the peak, whereby the measured distance will equal the optical distance of said beam splitter from the first surface along said second path;
   calculating the determinable distance as a function of the measured distance; and
   summing the measured distance and the calculated distance thereby determining the distance between said first and second surfaces.

19. The invention as defined in claim 18 including positioning a window surface along the second path for reflecting the sub-beam to the beam splitter and to the detector to cause a detector output peak when the mirror is positioned at a distance from the beam splitter equal to the window surface distance from the intersection;
   calibrating the position of the window surface to accurately determine its position, whereby the mirror position is accurately known when the beam reflected from the window surface causes a detector output peak; and
   during subsequent measurements determining the position of the mirror from the beam splitter with reference to the calibrated position of the window surface.

* * * * *

UNITED STATES PATENT AND TRADEMARK OFFICE
CERTIFICATE OF CORRECTION

PATENT NO. : 5,325,177
DATED : June 28, 1994
INVENTOR(S) : Lauren M. Peterson

It is certified that error appears in the above-indentified patent and that said Letters Patent is hereby corrected as shown below:

Column 2, Line 19, Please delete "tile" and insert --the--.

Column 2, Line 20, Please delete "as-the" and insert --as the--.

Signed and Sealed this

Twenty-ninth Day of November, 1994

Attest:

BRUCE LEHMAN

Attesting Officer    Commissioner of Patents and Trademarks